United States Patent

Morris et al.

[11] Patent Number: 6,066,931
[45] Date of Patent: May 23, 2000

[54] MOTOR CONTROLLER UNIT HAVING THERMAL STARTUP PROTECTION

[75] Inventors: Robert A. Morris, Burlington; Samir Chreim, Plainville; Charles S. Pitzen, Farmington, all of Conn.; Richard Fischer, Bloomington, Ill.; José Muñoz, Barcelona, Spain

[73] Assignee: General Electric Company, Schenectady, N.Y.

[21] Appl. No.: 08/997,108

[22] Filed: Dec. 23, 1997

[51] Int. Cl.$^7$ .................................................. H02P 7/00
[52] U.S. Cl. .......................................... 318/445; 318/472
[58] Field of Search ................................ 318/283, 285, 318/778, 782, 445, 446, 449, 450, 452, 471, 472; 361/23, 28

[56] References Cited

U.S. PATENT DOCUMENTS

| | | | |
|---|---|---|---|
| 4,028,593 | 6/1977 | Newell | 318/471 |
| 4,476,423 | 10/1984 | Mallick, Jr. et al. | 318/782 |
| 5,341,080 | 8/1994 | Sanz | 318/778 |

*Primary Examiner*—Karen Masih
*Assistant Examiner*—Rina I. Duda
*Attorney, Agent, or Firm*—Cantor Colburn LLP; Damian G. Wasserbauer; Carl B. Horton

[57] ABSTRACT

A motor controller unit includes an operating program that controllably responds to manual motor start and stop commands for protection of the semiconductor switches connected with each phase of a multi-phase electric motor. Upon receipt of a start command, a determination is made as to whether the measured time lapse between a previous stop command is less than a predetermnined time delay period.

14 Claims, 4 Drawing Sheets

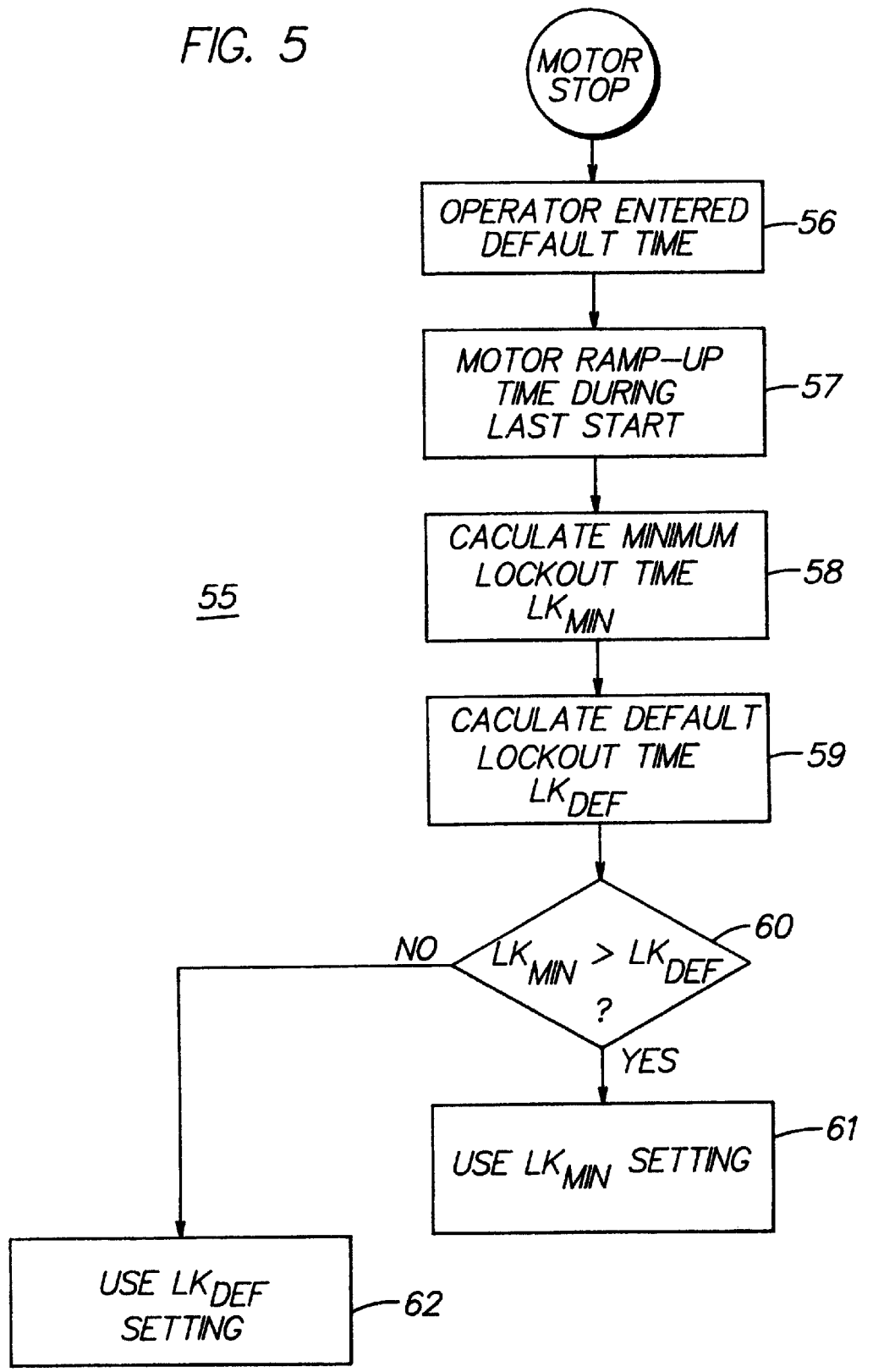

MOTOR CONTROLLER UNIT HAVING THERMAL STARTUP PROTECTION

BACKGROUND OF THE INVENTION

Motor control devices having controlled "soft start" and "soft stop" function wherein the motor is protected from overcurrent surges during both starting and stopping operations is described within U.S. Pat. No. 5,341,080 entitled "Apparatus and Three Phase Induction Motor Starting and Stopping Control Method".

Motor control devices having improved thermal protection for the semiconductor switches used to control the motor start and stop functions are described in U.S. patent application Ser. No. 08/904,293 filed on Jul. 31, 1997 entitled "Compact Electrical Equipment Enclosure".

Means are employed to prevent an electric motor from being turned on for a fixed period of time after turn-off in order to protect the motor and associated electrical equipment from thermal damage. One such arrangement is described within U.S. Pat. No. 3,815,668 entitled "Motor Controller Unit" to protect a cooling system compressor from being turned on for a two minute period after turn-off to protect the motor.

U.S. Pat. No. 3,854,631 entitled "Motor Starter Unit" describes a lockout counter to prevent motor restart after a predetermined number of motor starts to protect the electric motor and associated electric equipment from thermal damage.

An early attempt to protect a motor from overheat damage during start-up is described in U.S. Pat. No. 4,476,423 entitled "Motor Control Apparatus with Motor Starts Per Time Period Limiter" wherein the number of starts over a given time period is stored in memory. A minimum time period is calculated and the motor is prevented from start-up until the time period is exceeded.

It has since been determined that such semiconductor switches such as SCR's, when used within each pole of multi-pole electric motor to control the starting and stopping function can become subjected to thermal damage when an attempt is made to re-start a motor while the SCR's are warm from previous operation.

Since the cool down rates for electric motor windings and SCR junctions are not the same, a predetermined start inhibit signal to protect motor windings within electric motors exterior to a motor controller cabinet may not be sufficient to prevent thermal damage to the SCR's used within the motor controller unit contained within the cabinet.

In the absence of heat sinks and cooling vents to control the temperature of the SCR's as described in the aforementioned U.S. patent application Ser. No. 08/904,293 such as used within compact motor controller units, it would be beneficial to utilize the SCR's during motor start-up and by-pass the SCR's during motor operation to keep the heat generated within the SCR's to a minimum.

Accordingly, one purpose of the invention is to describe a simple and inexpensive approach to ensuring protection to the motor controller unit SCR's independent from the means employed to prevent thermal damage to the motor windings, per se and in the absence of heat sinks, cooling vents and the like.

SUMMARY OF THE INVENTION

A motor controller unit includes an operating program that controllably responds to manual motor start and stop commands for protection of the semiconductor switches connected with each phase of a multi-phase electric motor. Upon receipt of a start command, a determination is made as to whether the measured tine lapse between a previous stop command is less than a predetermined time delay period. If the time lapse is not less than the time delay period, a start command is inputted to the associated electric motor. If the time lapse is less than the time delay period, the motor start is inhibited and an error message is displayed.

BRIEF DESCRIPTION OF THE DRAWINGS

FIG. 5 is a flow chart representation of a default algorithm protecting the electric circuit within the motor

DESCRIPTION OF THE PREFERRED EMBODIMENT

Figure 1:
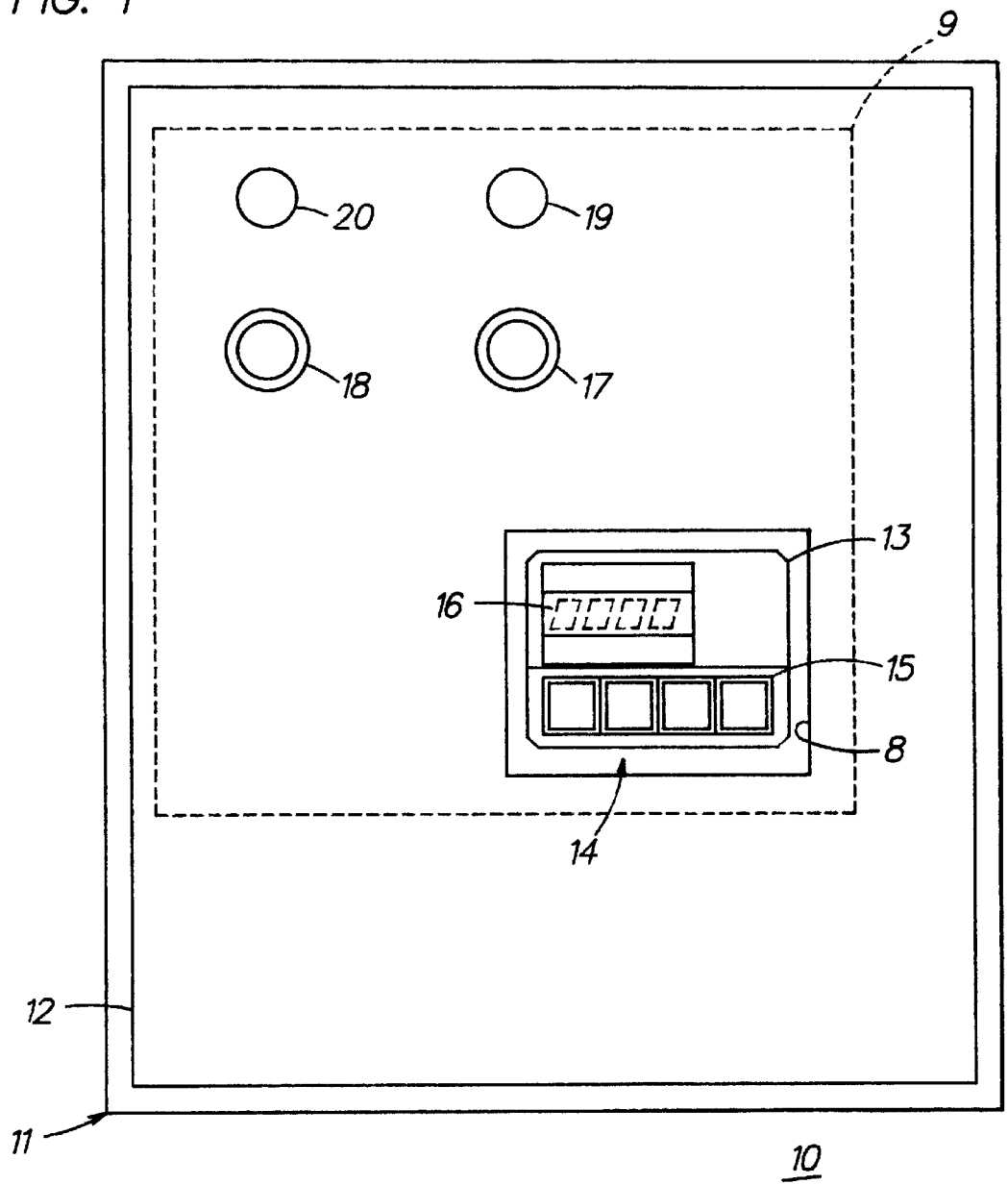
FIG. 1 is a front plan view of a motor control center containing the motor controller unit according to the invention.

An electric motor controller unit 9 within a conventional motor control panel 10 is shown in FIG. 1 which defines a housing 11 accessed by a door 12. A panel 13 visible via the aperture 8 includes a display 16, and a keypad 14 that carries the keys 15 allowing access to the controller 30 (FIG. 2) contained within the motor controller unit 9. The keypad allows access to the data stored within the controller unit. A motor start button 17 allows manual motor start function with the start status displayed on the indictor 19 while the motor stop button 18 allows manual motor stop function with the stop status displayed on the indicator 20.

Figure 2:
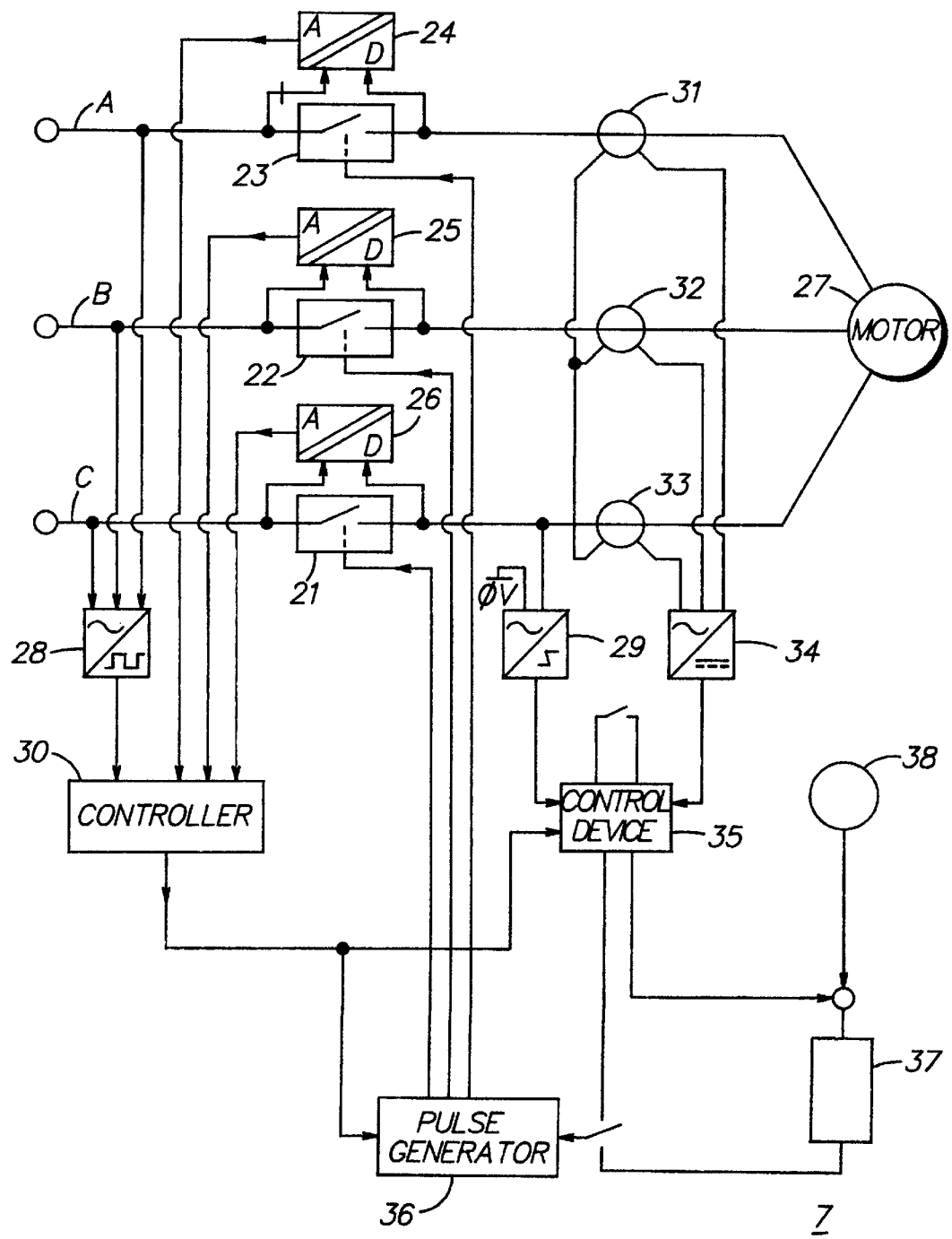
FIG. 2 is a diagrammatic representation of the control circuit used within the motor controller unit of FIG. 1.

Before discussing the circuit protection function of the invention, it is helpful to review the operation of the circuit 7 within the motor controller unit 9 as described within the aforementioned U.S. Pat. No. 5,341,080 as depicted in FIG. 2.

Three semiconductor switches 21–23, such as thyristors or triacs are connected in series between the three phases A, B, C of a three phase electrical power distribution system and the corresponding phases within a three phase induction motor 27. Each of the switches are connected in anti-parallel to allow current flow in both directions on both positive and negative cycles of the power system.

Corresponding A–D converters 24–26 are connected across the switches to provide digital indication of the states of the switches. A voltage comparator 28 functioning as a zero-crossing detector connects with each phase conductor and provides input to an electronic controller 30 which contains an EEPROM which receives input from each of the switches as to the conductive and nonconductive states thereof.

An EMP detector and voltage comparator 29 is connected within one phase of the power system. The comparator compares the voltage within each phase when the switch is nonconductive to a predetermined value and provides input to the switch controller 35. The voltage value obtained when the switch is nonconductive is an indication of the motor velocity and allows the switch controller to change the conduction angle of each of the switches in the manner described above. The current transformers 31–33 provide input to the current comparator 34 wherein the current in each phase is compared to a predetermined current value and allows the switch controller 35 to switch on all of the switches when the predetermined current value is exceeded. The switch controller 35 comprises an Intel type 80535 microprocessor programmed to analyze the information received from the controller 30 as to the zero crossing of the voltage and the conductive states of the switches. The controller 30 applies control signals to the pulse generator 36 for controlling the successive operation of the switches within each of the phases during start-up as described earlier. When the motor controller is operated by means of an adjustable velocity operating program resident in the switch controller 35, the signal generated by the velocity transducer 38 is compared with a reference value contained within the switch controller 35 that is coupled with the motor 27. The velocity transducer comprises either a tachometer or a pulse generator that produces a signal output proportional to the real time value of the motor velocity as described within the aforementioned U.S. Pat. No. 5,341,080.

Figure 3:
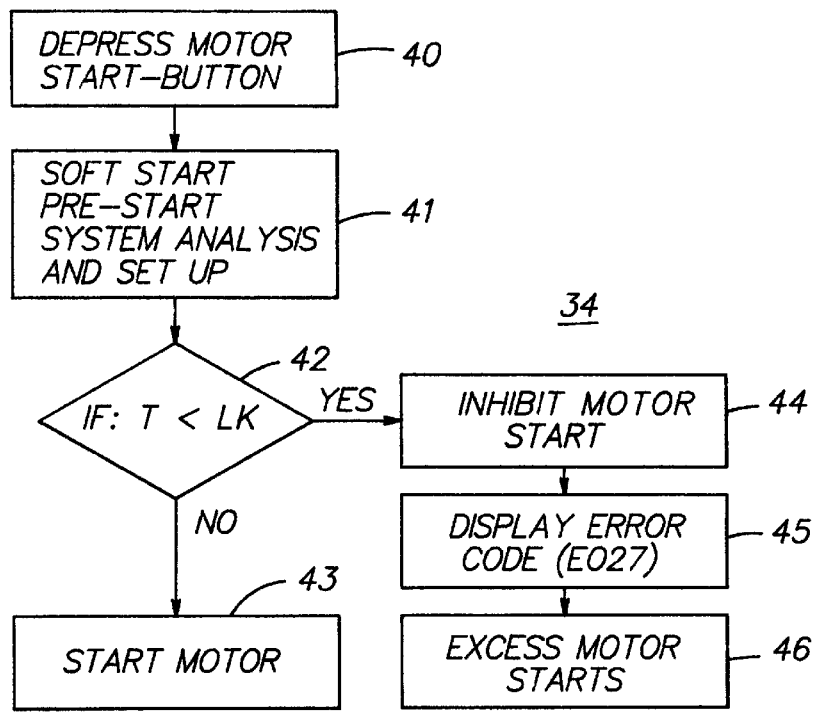
FIG. 3 is a flow chart representation of a control algorithm protecting the electric circuit within the motor controller unit of FIG. 1 during motor start-up.
Figure 4:
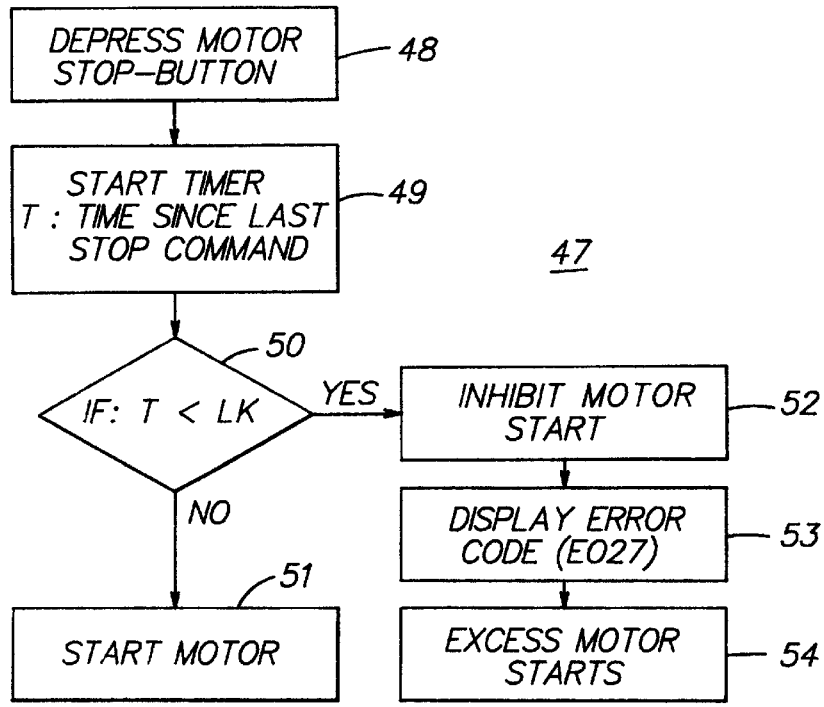
FIG. 4 is a flow chart representation of a control algorithm protecting the electric circuit within the motor controller unit of FIG. 1 during motor stoppage.

In accordance with the teachings of this invention, the start and stop buttons 17, 18, and start and stop indicators 19, 20 interact with the switch controller 35 (FIG. 2) by means of operating, programs contained within the switch controller microprocessor in accordance with the start flow chart diagram 39 of FIG. 3 and the stop flow chart diagram 47 of FIG. 4. Although a microprocessor is used within the switch controller, other circuitry that includes timers, relays and the like can be employed to provide the operating function.

When the start button is depressed (40), as shown in FIG. 3, an analysis is made within the microprocessor to determine the the of the last motor stop (41) and determination is made as to whether the time evolved (T) is shorter than a predetermined lock-out tine (LK) ranging from 2–45 minutes (42). If the time evolved is not less than the predetermined time, the motor is started (43). If the time evolved is less than the predetermined time, the motor is inhibited from starting (44), an error code is displayed (45) along with an indication of the excess motor starts (46).

When the stop button is depressed (48) an internal timer is incremented and the time since the last stop command is calculated (49). A determination is made as to whether the time evolved (T) is shorter than the predetermined lock-out tine (LK) ranging from 3–45 minutes (50). If the time evolved is not less than the predetermined time, the motor is started (51). If the tine evolved is less than the predetermined time, the motor is inhibited from starting (52), an error code is displayed (53) along with an indication of the excess motor starts (54). An alternative approach to protecting the electronic switches within the motor controller unit is to calculate a motor lock-out default time $Lk_{def}$ and minimum lock-out time $Lk_{min}$ for each value of motor current according to the following logic table and generating an algorithm for operation within the switch controller 35 of FIG. 2 in accordance with the default flow chart 55 shown in FIG. 5.

When the motor is stopped, the proposed default time (56) and the stored ramp-up time during the last previous start (57) are used to determine the minimum lock-out time $Lk_{min}$ (58) as well as the actual default time $Lk_{def}$ (59) based on the logic table values. The minimum lock-out time is compared to the default lock-out time (60) and if the minimum lock-out time is greater than the default lock-out time, the minimum lock-out setting is used within the current comparator 34 of FIG. 2 to provide lock-out function upon re-start (61). If the minimum lock-out time is less than the default lock-out time, the default setting is used to provide the lock-out function (62).

| Minimum Default Logic Table | | | |
| --- | --- | --- | --- |
| Current Limit - % | 20 Sec. Def. = 2 | 10 Sec. Def. = 2 | 5 Sec. Def. = 2 |
| 200 | 5.0 | 3.0 | 2.0 |
| 300 | 7.5 | 3.75 | 3.0 |
| 400 | 15.0 | 7.5 | 3.75 |
| 450 | 60.0 | 15.0 | 7.5 |

It has thus been shown that a simple program within the motor controller unit switch control microprocessor can be used to prevent overheating of the expensive semiconductor switches employed within the motor controller circuit without an expenditure of additional circuit components.

We claim:

1. A motor controller unit having semiconductor circuit component protection comprising:
    an enclosure;
    a plurality of semiconductor switches within said enclosure interconnecting with a switch controller circuit and a multi-phase electric motor, one of said switches being connected with one phase of said multi-phase motor;
    an inhibitable motor start circuit mounted within said enclosure connecting with said switch controller circuit for actuating said switch controller circuit to cause a motor start of said multi-phase motor;
    a first timer for measuring a time elapsed since a last motor stop, during which no said motor start has occurred;
    a first memory for storing at least one programmable default motor lock-out delay; and
    a processor for comparing said time elapsed to said at least one programmable default motor lock-out delay; said processor selectively inhibiting said motor start circuit;
    whereby said processor, upon sensing that no said last motor stop has occurred, does not inhibit said motor start circuit; and
    whereby said processor, upon sensing that said last motor stop has occurred, inhibits said motor start circuit to said motor until said time elapsed equals or exceeds said at least one programmable default motor lock-out delay so as to protect said semiconductor switches from overheating.

2. The motor controller unit of claim 1 wherein said semiconductor switches comprise at least one of an SCR and a thyristor.

3. The motor controller unit of claim 1 wherein said inhibitable motor start circuit includes a microprocessor.

4. The motor controller unit of claim 1 further including a motor stop button on said enclosure connecting with said switch controller circuit for actuating said switch controller circuit to stop said motor.

5. A motor controller unit having circuit component protection comprising:
    an enclosure;
    a plurality of semiconductor switches within said enclosure interconnecting with a switch controller circuit and a multi-phase electric motor, one of said switches being connected with one phase of said multi-phase motor;
    a motor start button on said enclosure connecting with said switch controller circuit for actuating said switch controller circuit to start said motor; and
    a timer connecting with said start button for determining a time duration since a last motor stop function and comparing said time duration to a predetermined lock-out time before turning on said semiconductor switches to start said motor;

wherein said time duration ranges from 2–45 minutes.

6. The motor controller unit of claim 1 including a digital display on said enclosure for displaying an error code when said time elapsed is less than said at least one default motor lock-out delay.

7. A motor controller unit having circuit component protection comprising:

an enclosure;

a plurality of semiconductor switches within said enclosure interconnecting with a switch controller circuit and a multi-phase electric motor, one of said switches being connected with one phase of said multi-phase motor;

a motor start button on said enclosure connecting with said switch controller circuit for actuating said switch controller circuit to start said motor; and a timer connecting with said start button for determining a time duration since a last motor stop function and comparing said time duration to a predetermined lock-out time before turning on said semiconductor switches to start said motor;

said motor controller unit including a heat sink within said enclosure wherein said semiconductor switches are arranged on said heat sink.

8. The motor controller unit of claim 1 wherein said semiconductor switches are arranged within said enclosure in the absence of a heat sink.

9. A method of protecting semiconductor switches from overheating within a motor controller unit comprising:

programming a predetermined motor lock-out time;

determining a time duration between a previous motor stop and a current motor start attempt;

comparing said time duration to said lock-out time; and preventing an associated electric motor from being started when said time duration is less than said lock-out time.

10. The method of claim 9 including displaying an error signal when said time duration is less than said lock-out time.

11. A method of protecting semiconductor switches within a motor controller unit comprising:

providing a first default motor lock-out time;

providing a motor ramp-up time for a previous motor start;

calculating a minimum lock-out time from said first default motor lock-out time and said motor ramp-up time;

calculating a second default motor lock-out time from said first default motor lock-out time and said motor ramp-up time;

comparing said minimum lock-out time to said second default motor lock-out time; and using said minimum lock-out time for preventing an associated electric motor from being started when said minimum lock-out time is greater than said second default motor lock-out time.

12. A method of protecting semiconductor switches within a motor controller unit comprising:

providing a first default motor lock-out time;

providing a motor ramp-up time for a previous motor start;

calculating a minimum lock-out time from said first default motor lock-out time and said motor ramp-up time;

calculating a second default motor lock-out time from said first default motor lockout time and said motor ramp-up time;

comparing said minimum lock-out time to said second default motor lock-out time; and using said second default motor lock-out time for preventing an associated electric motor from being started when said minimum lock-out time is less than said second default motor lockout time.

13. A motor controller unit having circuit component protection comprising:

a first timer for measuring a time elapsed since a last motor stop;

a second timer for measuring a motor ramp-up time of a prior motor start;

a current sensor for measuring a motor ramp-up current draw of said prior motor start;

a processor for storing at least one programmable default motor lock-out delay;

for storing said motor ramp-up time;

for storing said motor ramp-up current draw;

for storing memory for storing a look-up table of motor ramp-up delays; and for determining at least a minimum lock-out time since said last motor stop during which an associated electric motor is inhibited from being started by said processor;

whereby said processor, upon sensing that no said prior motor start has occurred, does not inhibit said motor start; and whereby said processor, upon sensing that said prior motor start has occurred, selects a ramp-up delay from said look-up table based on said motor ramp-up time and said motor ramp-up current draw, and compares said ramp-up delay with said at least one default motor lock-out delay, selecting a longer delay of the two said delays, and inhibits any start command to said associated electric motor until said time elapsed equals or exceeds said longer of the two delays.

14. A motor controller unit having circuit component protection comprising:

an enclosure;

a plurality of semiconductor switches within said enclosure interconnecting with a switch controller circuit and a multi-phase electric motor, one of said switches being connected with one phase of said multi-phase motor;

an inhibitable motor start circuit mounted within said enclosure connecting with said switch controller circuit for selectively actuating said switch controller circuit to start said motor;

a first timer for measuring a time elapsed since a last motor stop;

a first memory for storing at least one programmable default motor lock-out delay;

a processor for comparing said time elapsed to said at least one default motor lock-out delay; said processor selectively inhibiting said motor start circuit;

whereby said processor, upon sensing that no said prior motor start has occurred, does not inhibit said electric motor start; and whereby said processor, upon sensing that said prior motor start has occurred, inhibits said motor start circuit to said motor until said time elapsed equals or exceeds said at least one default motor lock-out delay.

* * * * *